US010915899B2

(12) United States Patent
Lopez et al.

(10) Patent No.: US 10,915,899 B2
(45) Date of Patent: Feb. 9, 2021

(54) REPLACING TOKEN ON A MULTI-TOKEN USER DEVICE

(71) Applicant: Visa International Service Association, San Francisco, CA (US)

(72) Inventors: Eduardo Lopez, Menlo Park, CA (US); Robert Michael Yost, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 650 days.

(21) Appl. No.: 15/462,658

(22) Filed: Mar. 17, 2017

(65) Prior Publication Data

US 2018/0268405 A1   Sep. 20, 2018

(51) Int. Cl.
*G06Q 20/40* (2012.01)
*G06Q 30/00* (2012.01)
(Continued)

(52) U.S. Cl.
CPC ......... *G06Q 20/401* (2013.01); *G06Q 20/204* (2013.01); *G06Q 20/227* (2013.01);
(Continued)

(58) Field of Classification Search
CPC .. G06Q 20/401; G06Q 20/204; G06Q 20/227; G06Q 20/3552; G06Q 20/3572; G06Q 20/385
See application file for complete search history.

(56) References Cited

U.S. PATENT DOCUMENTS

| 2,016 A | * | 3/1841 | Sawyer | F24B 1/18 126/500 |
| 5,613,012 A | | 3/1997 | Hoffman | |

(Continued)

FOREIGN PATENT DOCUMENTS

| EP | 2156397 A1 | 2/2010 |
| GB | 2533171 A | 6/2016 |

(Continued)

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

(Continued)

*Primary Examiner* — Mamon Obeid
*Assistant Examiner* — Jahed Ali
(74) *Attorney, Agent, or Firm* — Kilpatrick Townsend & Stockton LLP

(57) ABSTRACT

Embodiments of the invention are directed to methods, systems, and devices for replacing a token on a user device, such as a transaction card. The transaction card includes tokens representing an actual account identifier which is not visible on the transaction card. The transaction card may store a first token on a and include a digital display that displays a second token. When the first token or the second token is compromised, the compromised token is replaced without replacing the transaction card. When the second token is compromised, the compromised token is replaced with a new replacement second token using an electronic device. The replacement second token replaces the old second token on the digital display. After the second token is compromised and before the replacement second token is provisioned on the transaction card, the transaction card may (Continued)

still be used for transactions using other tokens provisioned on the card.

17 Claims, 6 Drawing Sheets

(51) Int. Cl.
    *G06Q 20/22*          (2012.01)
    *G06Q 20/34*          (2012.01)
    *G06Q 20/38*          (2012.01)
    *G06Q 20/20*          (2012.01)

(52) U.S. Cl.
    CPC ..... *G06Q 20/3552* (2013.01); *G06Q 20/3572* (2013.01); *G06Q 20/385* (2013.01); *G06Q 20/40* (2013.01); *G06Q 20/4016* (2013.01); *G06Q 30/0185* (2013.01)

(56) References Cited

U.S. PATENT DOCUMENTS

| | | | |
|---|---|---|---|
| 5,781,438 A | 7/1998 | Lee |
| 5,883,810 A | 3/1999 | Franklin |
| 5,953,710 A | 9/1999 | Fleming |
| 5,956,699 A | 9/1999 | Wong |
| 6,000,832 A | 12/1999 | Franklin |
| 6,014,635 A | 1/2000 | Harris |
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem Ur |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,132,723 B2 | 3/2012 | Hogg et al. |
| 8,171,525 B1 | 5/2012 | Pelly |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |

(56) References Cited

U.S. PATENT DOCUMENTS

| | | |
|---|---|---|
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,433,116 B2 | 9/2013 | Davis et al. |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,694,438 B1 * | 4/2014 | Jernigan ............ G06Q 20/3274 705/67 |
| 8,739,262 B2 * | 5/2014 | Harper .................. G06F 21/335 726/9 |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,256,872 B2 * | 2/2016 | Brabson ............... G06Q 20/385 |
| 9,280,765 B2 | 3/2016 | Hammad |
| 9,530,137 B2 | 12/2016 | Weiss |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |

(56) References Cited

U.S. PATENT DOCUMENTS

| | | |
|---|---|---|
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0086389 A1* | 4/2013 | Suwald ............ G06Q 20/341 713/185 |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191227 A1 | 7/2013 | Pasa et al. |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |

(56) References Cited

U.S. PATENT DOCUMENTS

| | | |
|---|---|---|
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1* | 11/2014 | Raj .................... G06Q 20/385 705/44 |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1* | 1/2015 | Dill .................... G06Q 20/4016 705/44 |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0066768 A1* | 3/2015 | Williamson ........ G06Q 20/4097 705/44 |
| 2015/0081544 A1 | 3/2015 | Schulz et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1* | 7/2015 | Palanisamy ............ G06Q 20/34 705/67 |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0339663 A1* | 11/2015 | Lopreiato ........ G06Q 20/3278 705/67 |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0098548 A1* | 4/2016 | Vancini .................. G06F 21/45 726/4 |
| 2016/0103675 A1 | 4/2016 | Aabye et al. |
| 2016/0104153 A1* | 4/2016 | Anderson .............. G06Q 20/40 705/66 |
| 2016/0110709 A1* | 4/2016 | Lacoss-Arnold ........................... G06Q 20/3821 705/75 |
| 2016/0119296 A1 | 4/2016 | Laxminarayanan et al. |
| 2016/0140545 A1 | 5/2016 | Flurscheim et al. |
| 2016/0140546 A1* | 5/2016 | Taratine .............. G06Q 20/325 705/76 |
| 2016/0148197 A1* | 5/2016 | Dimmick .............. G06Q 20/36 705/67 |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0210628 A1 | 7/2016 | McGuire |
| 2016/0218875 A1 | 7/2016 | Le Saint et al. |
| 2016/0224976 A1 | 8/2016 | Basu |
| 2016/0224977 A1 | 8/2016 | Sabba et al. |
| 2016/0232520 A9* | 8/2016 | Singhal .................. G06Q 20/12 |
| 2016/0232527 A1 | 8/2016 | Patterson |
| 2016/0239842 A1 | 8/2016 | Cash et al. |
| 2016/0267466 A1* | 9/2016 | Kumnick ............ G06Q 20/3227 |
| 2016/0267467 A1* | 9/2016 | Rutherford .......... G06Q 20/385 |
| 2016/0275512 A1* | 9/2016 | Bondesen ............ G06Q 20/405 |
| 2017/0046696 A1 | 2/2017 | Powell et al. |
| 2017/0103387 A1 | 4/2017 | Weber |
| 2017/0220818 A1 | 8/2017 | Nagasundaram et al. |
| 2017/0221066 A1* | 8/2017 | Ledford .............. G06Q 20/407 |
| 2017/0228723 A1 | 8/2017 | Taylor |
| 2017/0364880 A1* | 12/2017 | Malhotra ............ G06Q 20/105 |
| 2018/0075447 A1* | 3/2018 | Moreton ............ G06Q 20/3672 |
| 2019/0213587 A1* | 7/2019 | Chen ........................ H04L 9/14 |
| 2019/0392443 A1* | 12/2019 | Piparsaniya ............ G06Q 20/22 |
| 2020/0127994 A1* | 4/2020 | Kukreja ................ G06F 21/335 |

FOREIGN PATENT DOCUMENTS

| | | |
|---|---|---|
| KR | 1020120059473 | 6/2012 |
| WO | 2001035304 A1 | 5/2001 |
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |

(56) References Cited

FOREIGN PATENT DOCUMENTS

| WO | 2013179271 | A2 | 12/2013 |
| WO | 2016183338 | | 11/2016 |

OTHER PUBLICATIONS

Wang, U.S. Appl. No. 62/000,288 (unpublished), Payment System Canonical Address Format filed May 19, 2014.

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

Gaddam et al., U.S. Appl. No. 62/053,736 (unpublished), Completing Transactions Without a User Payment Device filed Sep. 22, 2014.

Patterson, U.S. Appl. No. 62/054,346 (unpublished), Mirrored Token Vault filed Sep. 23, 2014.

Stubbs et al., U.S. Appl. No. 62/103,522 (unpublished), Methods and Systems for Wallet Provider Provisioning filed Jan. 14, 2015.

Flurscheim et al., U.S. Appl. No. 62/108,403 (unpublished), Wearables With NFC HCE filed Jan. 27, 2015.

Kinagi, U.S. Appl. No. 62/117,291 (unpublished), Token and Cryptogram Using Transaction Specific Information filed Feb. 17, 2015.

Galland et al. U.S. Appl. No. 62/128,709 (unpublished), Tokenizing Transaction Amounts filed Mar. 5, 2015.

Rangarajan et al., U.S. Appl. No. 61/751,763 (unpublished), Payments Bridge filed Jan. 11, 2013.

Li, U.S. Appl. No. 61/894,749 (unpublished), Methods and Systems for Authentication and Issuance of Tokens in a Secure Environment filed Oct. 23, 2013.

Aissi et al., U.S. Appl. No. 61/738,832 (unpublished), Management of Sensitive Data filed Dec. 18, 2012.

Powell, U.S. Appl. No. 61/892,407 (unpublished), Issuer Over-The-Air Update Method and System filed Oct. 17, 2013.

Powell, U.S. Appl. No. 61/926,236 (unpublished), Methods and Systems for Provisioning Mobile Devices With Payment Credentials and Payment Token Identifiers filed Jan. 10, 2014.

Chipman, et al., U.S. Appl. No. 15/265,282 (Unpublished), Self-Cleaning Token Valut, filed Sep. 14, 2016.

PCTUS2018022924 , "International Search Report and Written Opinion Received", dated Jul. 11, 2018, 15 pages.

Georgina Park, "How You Can Use Tokenization to Reduce PCI Scope", https://www.pcicomplianceguide.org/how-you-can-use-tokenization-to-reduce-pci-scope/, Aug. 4, 2015, 6 pages.

First Data, "EMV and Encryption + Tokenization: A Layered Approach to Security", https://www.firstdata.com/downloads/thought-leadership/EMV-Encrypt-Tokenization-WP, 2012, , 12 pages.

Securosis, "Understanding and Selecting a Tokenization Solution", https://securosis.com/assets/library/reports/Securosis_Understanding_Tokenization_V.1_.0_.pdf , 33 pages.

Jaikumar Vijayan/Computerworld, "Banks push for tokenization standard to secure credit card payments", http://www.computerworld.com/article/2487635/data-security/banks-push-for-tokenization-standard-to-secure-credit-card-payments.html, Feb. 12, 2014, 7 pages.

EP18767466.8 , "Extended European Search Report", dated Mar. 6, 2020, 9 pages.

* cited by examiner

REPLACING TOKEN ON A MULTI-TOKEN USER DEVICE

CROSS-REFERENCE TO RELATED APPLICATIONS

None.

BACKGROUND

A transaction card is a physical device associated with an account of an account holder. Exemplary transaction cards may include payment cards (e.g. a debit card, a credit card or a prepaid card), identification cards, access cards (e.g. a building access card) and the like. The transaction card may enable the account holder present account information embedded in the transaction card to a third party entity. For example, the transaction card may be used to conduct a transaction (e.g. a payment transaction) at a merchant.

Often, the transaction card will have the account identifier associated with the account embossed (or otherwise printed) on the card. Therefore, a fraudulent party may get a hold of the account identifier simply by looking at the transaction card. Thus, even when the account holder may be in possession of the transaction card, the account identifier may be stolen and used to conduct fraudulent transactions. When the fraudulent party uses the account identifier to commit fraud or when the account identifier is otherwise compromised, the transaction card must be destroyed by the account holder and a new (e.g. replacement) transaction card is provided to the account holder within a predetermined amount of time (e.g. few days or a week). However, until the card is replaced, the account holder does not have access to the account or cannot use the transaction card to conduct any transactions. Sometimes, the account is blocked for further use before the account holder receives the replacement transaction card and activates the card by contacting the issuer of the account to confirm that the account holder is in possession of the replacement card.

In addition to the burden placed on the account holder (e.g. not being able to use the account and/or the transaction card for a period of time), replacing transaction cards has a production cost and an environmental cost (e.g. more plastic material being used to generate replacement cards along with any additional material such as material used for smart chips) associated therewith.

According to another conventional use of account identifiers, some transacting entities store the account holder information (e.g. account holder's account identifier) on file to conduct faster and more efficient transactions. However, storing actual account identifiers pose a security threat and is susceptible to information theft. In order to protect account holder information, some companies prefer to store tokens instead of account identifiers. Such companies interact with the transaction processing entities and/or issuer entities that issued the account identifiers to obtain tokens representing the actual account identifiers. Current systems do not allow the account holders to provide tokens to be stored on file by transacting entities.

Embodiments of the invention address this and other problems, individually and collectively.

BRIEF SUMMARY

Embodiments provide a user device (such as a transaction card) including one or more tokens representing an actual account identifier associated with an account of an account holder. According to various embodiments, the account identifier is not visible on the transaction card. For example, in some embodiments, the actual account number may be stored on a contact, contactless or dual-interface chip of the transaction card. In yet other embodiments, the actual account number may not be stored or otherwise provided on the transaction card. Thus, in some embodiments, the holder of the transaction card may not learn the account identifier by simply being in possession of the transaction card.

The transaction card may store the account identifier or a first token representing the account identifier on the contact, contactless or dual-interface chip coupled to the transaction card. The transaction card may include a digital display that displays a second token representing the account identifier. The second token representing the account identifier may be provided on the transaction card using electronic ink. Thus, when the holder of the transaction card (e.g. the account holder, the user) needs to provide account information to a resource provider, the holder may not have access to the account identifier and may provide the second token instead. If the second token is compromised, the second token may be replaced without replacing the transaction card. The transaction card may store additional tokens representing the account identifier. For example, a third token may be stored at a magnetic stripe coupled to the transaction card.

When the second token is compromised, a replacement (e.g. new) second token may be pushed to the transaction card. The replacement second token may replace the old second token on the digital display. After the second token is compromised and before the replacement second token is provisioned on the transaction card, the transaction card may still be used for transactions using other tokens provisioned on the transaction card (e.g. the first token or the account identifier stored on the contact, contactless or dual-interface chip of the transaction card).

According to various embodiment, an expired, stolen or compromised token on the transaction card may be replaced with a replacement token using an electronic device such as a resource provider terminal (e.g. a point of sale terminal (POS)), a communication device (e.g. a mobile phone) or an authorizing computer terminal (e.g. an automated teller machine (ATM) of an issuer). The authorizing computer may send the replacement token to the electronic device using a message, for example an authorization response message, an over-the-air message via cellular communication network, or a system update message.

Embodiments of the invention are directed to methods, systems, and devices for replacing a token on a transaction card. The method, performed by a server computer, includes transmitting a tokenization request message to a token service provider system. The tokenization request message includes an account identifier representing an account. The method also includes receiving, from the token service provider system, a plurality of tokens corresponding to the account identifier. The method includes provisioning the plurality of tokens on a user device. Each token is associated with a different communication channel between the user device and a token recipient device. The method further includes deactivating at least one token among the plurality of tokens when the at least one token is compromised, and transmitting a replacement token to an electronic device such that the at least one token on the user device is replaced with the replacement token when the user device is in communication with the electronic device.

Embodiments of the invention may provide a user device comprising a substrate and a dynamic display provided on the substrate displaying a first token representing an account identifier associated with an account. The user device may also include a data storage unit coupled to the substrate storing a second token representing the account identifier, the second token being different from the first token. According to some embodiments, when the user device is in communication with an electronic device, the first token displayed on the dynamic display is replaced with a replacement token representing the account identifier. The first token and the replacement token may be restricted in use based on a type of communication between the user device a token-recipient device. In some embodiments, the plurality of tokens are provisioned on the user device instead of the account identifier. The user device may also include a data storage unit coupled to the substrate storing the account identifier such that the account identifier is invisible on the user device. In some embodiments, the user device may be a transaction card.

Embodiments of the invention may provide methods, systems, and devices for replacing a token on a transaction card. The method, performed by a server computer, includes receiving a tokenization request message from an authorizing computer. The tokenization request message includes an account identifier associated with an account. The method may also include generating a first token and a second token associated with the account identifier and storing the first token, the second token, and a mapping between the first token, the second token and the account identifier at a storage. The method may further include transmitting the first token and the second token to the authorizing computer. The server computer may receive, from a resource provider computer, a processing request including the first token. The server computer may determine that the first token has been compromised or expired, and generate a replacement token associated with the account identifier to replace the first token. The server computer may transmit an authorization response message to the resource provider computer. The authorization response message includes a replacement token that replaces the first token on a user device in communication with the resource provider computer.

These and other embodiments of the invention are described in further detail below.

DETAILED DESCRIPTION

Figure 1:
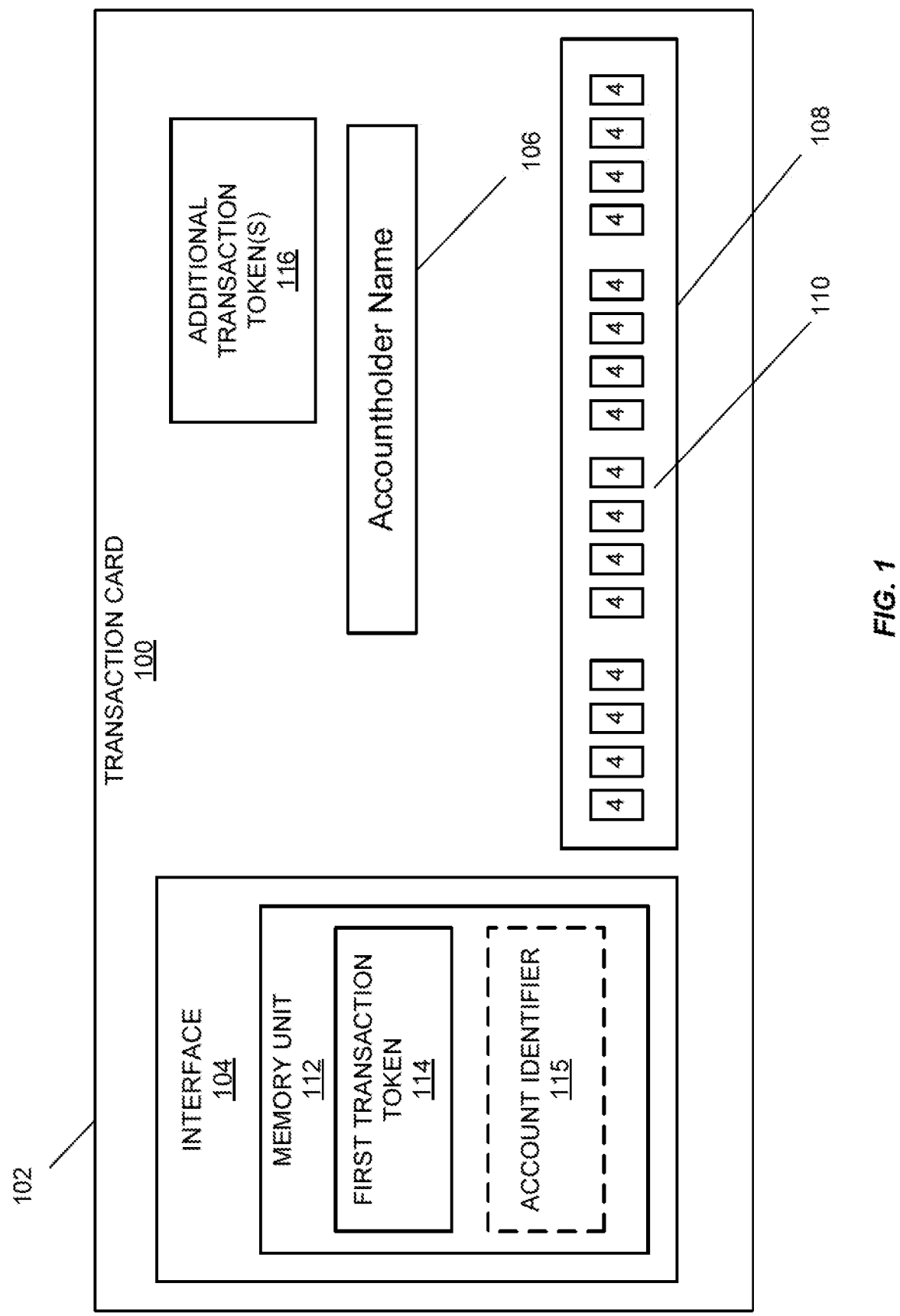
FIG. 1 shows a block diagram of an exemplary transaction card according to an embodiment of the invention.

Prior to discussing the details of some embodiments of the present invention, description of some terms may be helpful in understanding the various embodiments.

A "server computer" may typically be a powerful computer or cluster of computers. For example, the server computer can be a large mainframe, a minicomputer cluster, or a group of servers functioning as a unit. In one example, a server computer may be a database server coupled to a Web server. Data transfer and other communications between components such as computers may occur via any suitable wired or wireless network, such as the Internet or private networks. The server computer may be associated with an entity such as a resource provider, a database (e.g. an information database, an application database, an entertainment database), an transaction processing entity or an authorizing entity.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

An "account holder" may hold an account. An "account holder" may include an individual or an entity that uses a system. An account holder may be associated with one or more accounts and/or user devices. In some cases, the account holder may also be referred to as a user or a consumer.

An "authorizing entity" (e.g. an issuer) may be an entity that authorizes a request. Examples of an authorizing entity may be an issuer, a governmental agency, a document repository, an access administrator, etc. An authorizing entity may operate an authorization computer. An "issuer" may refer to a business entity (e.g., a bank) that issues and optionally maintains an account for a user. An issuer may also issue payment credentials stored on a user device, such as a cellular telephone, smart card, tablet, or laptop to the consumer. The account (which may be associated with one or more user devices) may refer to any suitable account including payment accounts (e.g. a credit card account, a checking account, a savings account, a merchant account assigned to a consumer, a prepaid account, etc.), an employment account, an online account (e.g. email account, database subscription account, etc.).

A "user device" may include any suitable device that may be used to conduct a financial transaction, such as to provide payment credentials to a merchant. Suitable payment devices can be hand-held and compact so that they can fit into a user's wallet and/or pocket (e.g., pocket-sized). Example payment devices may include smart cards, keychain devices (such as the Speedpass™ commercially available from Exxon-Mobil Corp.), etc. Other examples of user devices include transaction cards, payment cards, smart media, transponders, objects that are connected via a network (i.e. internet of things (IoT) connected devices), and the like. If the payment device is in the form of a debit, credit, or smartcard, the payment device may also optionally have features such as magnetic stripes. Such devices can operate in either a contact or contactless mode.

A "resource provider" may be an entity that can provide a resource such as goods, services, information, and/or access. Examples of resource providers includes merchants, data providers, transit agencies, governmental entities, venue and dwelling operators, etc.

A "resource provider computer" may be a computer operated by a resource provider. Suitable computers may include access devices, back end server computers, as well as combinations of the above.

An "access device" may be any suitable device for providing access to an external computer system. An access device may be in any suitable form. Some examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device. The POS terminal may also be referred as a "request processing device". The access device may be include IoT connected device(s).

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. Other standard message formats may include ISO 20022 as well as block chain message format. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. In addition, an authorization request message may further comprise open data fields, in which additional values may be requested and stored. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization.

An "account identifier" may include any suitable information associated with an account of a user which identifies the account. Such information may be directly related to the account or may be derived from information related to the account. For example, an account identifier may include an account number, an employment identification number, a virtual account identifier, a primary account number (PAN), a token, a service code, a CVV (card verification value), a dCVV (dynamic card verification value), CVV2 (Card Verification Value 2), CVC3 card verification values, an expiration date, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). The PAN may be a variable length, (e.g. 13 to 19-digit) industry standard-compliant account number that is generated within account ranges associated with a Bank Identification Number (BIN) by an issuer.

A "token" may be a substitute value for a credential. A token may be a string of numbers, letters, or any other suitable characters. Examples of tokens include payment tokens, access tokens, personal identification tokens, etc. A payment token may include an identifier for an account that is a substitute for account data, such as an account number. For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing network computers. In some embodiments, a token may be used in place of an account number to initiate, authorize, settle or resolve a transaction or represent the original credential in other systems where the original credential would typically be provided. In some embodiments, a token value may be generated such that the recovery of the original account number or other account identifier from the token value may not be computationally derived. Further, in some embodiments, the token format may be configured to allow the entity receiving the token to identify it as a token and recognize the entity that issued the token.

Embodiments of the invention provision tokens on a user device, such as a transaction card. Any type of user device such as a mobile communication device or a key fob may be used in connection with the embodiments of the present invention. Even though a transaction card is used as an exemplary user device in the following description, the use of the transaction card is for illustration purposes and should not be construed as limiting.

The transaction card can be issued with at least two tokens: a first token and a second token. A first token may be provisioned on a contact, contactless or dual interface chip. The first token may be restricted to in-person transaction channels such as terminal entry modes for contact, contactless or magnetic stripe transactions. In some embodiments, a different token may be issued and domain restricted to magnetic stripe transactions where chip card based cryptograms are not required for the transaction. A magnetic stripe transaction may be configured to work only in situations where a chip transaction is not supported. A second token (different from the first token) may be issued and displayed on the transaction card. In some embodiments, the second token may be dynamically displayed on the transaction card. For example, the second token may be displayed using a digital display. In some embodiments, the second token may be printed on a replaceable element coupled to the transaction card (e.g. a label or a sticker). The second token may be domain restricted to remote or e-commerce transactions (including key entered transactions).

According to various embodiments, if the second token is compromised, the transaction card may still be used to conduct transactions using the first token. In embodiments where the second token is digitally displayed on the card, the second token, if compromised, may be renewed or replaced with a replacement second token without having to replace the transaction card. The second token and the replacement second token are domain restricted to the same transaction type. That is, the second token and the replacement second token are restricted to the same communication channel between the transaction card and a token recipient device.

In some embodiments, only tokens are provisioned on the transaction card, without provisioning the actual account identifier corresponding to the tokens. In other embodiments, the account identifier (e.g. a primary account number (PAN)) may be provisioned or otherwise stored on the contact, contactless or dual interface chip. Accordingly, the account identifier may not be visible on the transaction card.

FIG. 1 illustrates a transaction card 100 according to various embodiments. The transaction card 100 may include a payment card such as a debit card, a credit card or a prepaid card; an identification card; an access card such as a building access card, and the like.

In some embodiments, the transaction card 100 may be a "smart card" or similar device, such as a credit or debit type card in which a chip is embedded. One form of such a device is known as an EMV (Europay™, MasterCard™, and Visa™) card. In the context of the present invention, EMV refers to a standard for interoperation of integrated circuit (IC) cards ("chip cards") and IC card capable POS terminals and ATMs, and is used for authenticating credit and debit card payments. The EMV standard defines the interactions at the physical, electrical, data and application levels between IC cards and IC card processing devices for use in financial transactions.

The transaction card 100 may display or store information associated with an account and a holder of the account (i.e. the owner of the transaction card 100). According to various embodiments, a user or a holder of the transaction card 100 may present the transaction card 100 or information stored on the transaction card 100 to a resource provider or a resource provider computer operated by the resource provider to obtain or use the resources provided by the resource provider. For example, if the transaction card 100 is a payment card, the transaction card 100 may be presented at a terminal (e.g. point of sale terminal) of the resource provider (e.g. a merchant) to conduct a transaction with the resource provider. In some embodiments, the user may enter the credentials (e.g. a token representing an account identifier) provided on the face of the transaction card 100 to a computer operated by the resource provider. According to another example, the transaction card 100 may electronically communicate with the terminal of the resource provide to transmit credentials that are invisibly stored on the transaction card 100.

The transaction card 100 may include a substrate 102. An account holder information such as the account holder name 106 or a token representing an account identifier may be embossed or otherwise printed on the substrate 102. The transaction card 100 may also include an interface 104 such as a contact interface, a contactless interface or a dual-purpose interface (e.g. a dual-interface chip that may be accessed through contact and contactless interfaces) coupled to the substrate 102. The interface 104 may include a memory unit 112 that stores a first token 114 representing the account identifier and/or, in some embodiments, the account identifier (e.g. an account number or a primary account number (PAN)) 115 associated with the account. When the user places the transaction card 100 in contact with or in proximity of a terminal (e.g. point of sale terminal), the interface 104 may transmit the first token to the terminal (or the terminal may retrieve the first token from the interface 104).

A digital display 108 such as an electronic paper display (EPD or e-paper), a light emitting diode (LED) display, a liquid crystal display (LCD), an organic light emitting diode (OLED) display, etc. may be coupled to the substrate 102. The digital display 108 may dynamically display a second token 110 representative of the account. The second token dynamically displayed on the digital display 108 may be changed or updated without replacing the transaction card 100, as discussed below in greater detail.

The transaction card 102 may include additional elements (e.g. a second memory and/or a magnetic stripe) to store and/or display additional transaction tokens 116 associated with the account.

Figure 2:
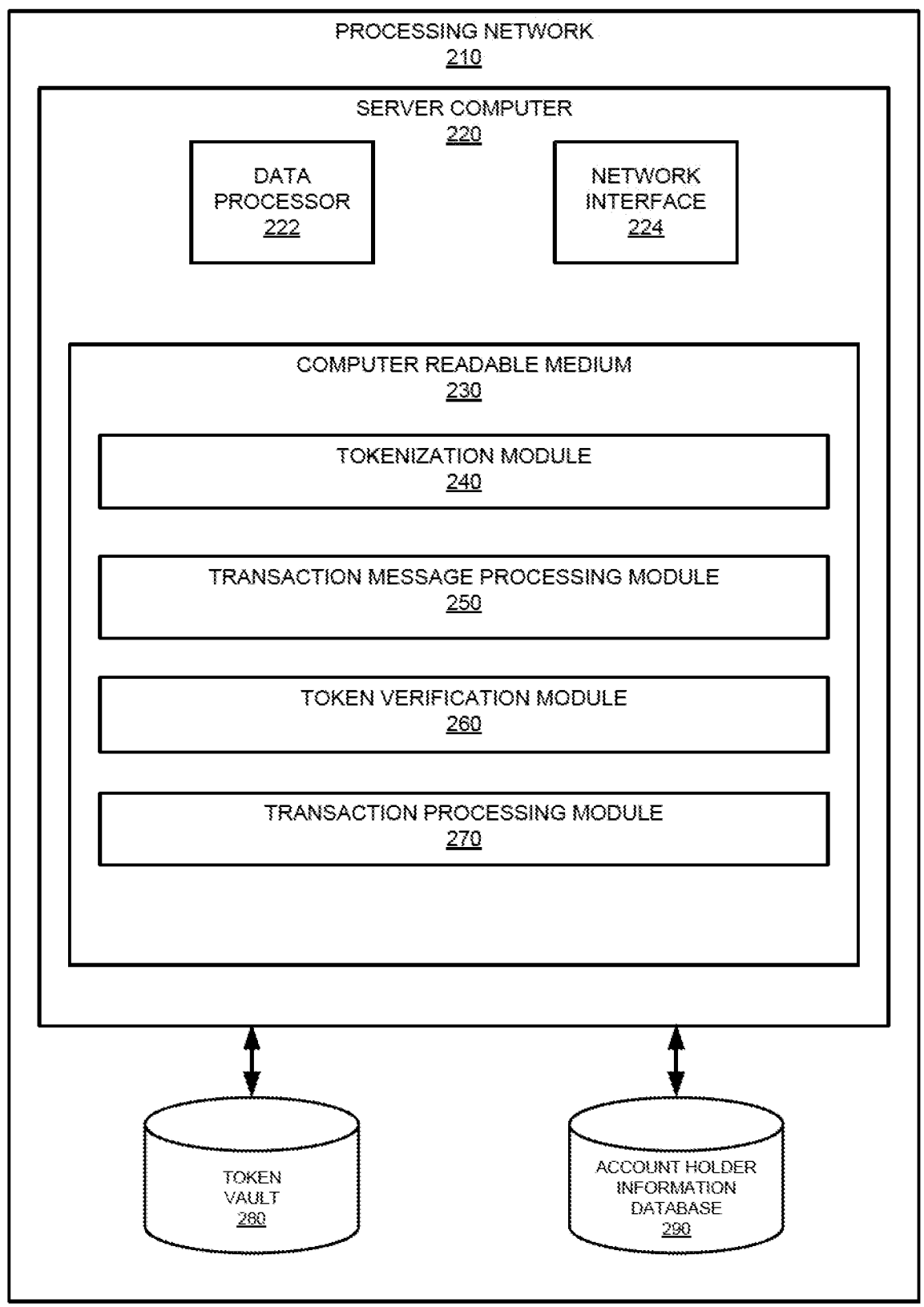
FIG. 2 shows a block diagram of a processing network according to an embodiment of the invention.

FIG. 2 illustrates an exemplary processing network 210 according to various embodiments. For example the processing network 210 (e.g. a transaction processing network) may be a payment transaction processing network. The processing network 210 may include a server computer 220 and various databases such as a token vault 280 where token to account identifier (e.g. PAN) mapping may be stored, and an account holder information database 290 where user information about account holders may be stored.

The server computer 220 may include a data processor 222, a network interface 224 and a computer readable medium 230 storing various modules for generating tokens and processing tokenized transactions. The various modules may include a tokenization module 240 for generating multiple tokens representing a same account, a transaction message processing module 250 for receiving an authorization request message and an authorization response message, a token verification module 260 for verifying the token in the authorization request message and identifying the account corresponding to the token, and a transaction processing module 270 for identifying an issuer of the account and providing the authorization request message along with any additional information to the issuer.

Other modules and submodules may also reside on the computer readable medium 230. Examples of additional modules may include a clearing and settlement module for processing and routing clearing messages and performing settlement between parties, and data extraction (e.g., for retrieving data from external data sources such as databases) modules, storage modules, and message modification modules. Each module in the processing network 210 may be combined with any of the additional modules as appropriate. Each module in the processing network 210 may comprise one or submodules, where each submodule may comprise one or more functions implemented by code, executable by the data processor 222.

The data processor 222 (e.g., a microprocessor) may process functions of the server computer 220. The data processor 222 may include hardware that can carry out instructions embodied as code in a computer-readable medium. The data processor 222 may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

The network interface 224 may be any suitable combination of hardware and software that enables data to be transferred to and from the processing network 210. The network interface 224 may enable the processing network 210 to communicate data to and from another device (e.g., resource provider computer, transport computer, authorization computer, etc.). Some examples of the network interface 224 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 224 may include Wi-Fi™.

Data transferred via the network interface 224 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 224 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

According to various embodiments, the processing network 210 may generate, using the data processor 222, tokens to identify an account. The tokens may be used as proxy to the account identifier (e.g. PAN) associated with the account. In some embodiments, the account holder, a third party entity (e.g. a resource provider) or the issuer of the account may request the processing network 210 to generate the tokens. The tokenization module 240 of the processing network 210 may be configured, in conjunction with the data processor 222, to generate one or more tokens to represent or otherwise identify the account. In some embodiments, each token may be associated with a transaction channel. For example, a first token may be generated for use in e-commerce transactions and a second token may be generated for use in contact transactions where the transaction card 100 is brought in contact with a terminal such as a POS terminal. The e-commerce and contact transaction channels are exemplary transaction channels and should not be construed as limiting. The tokenization module 240 may generate, using the data processor 222, additional tokens for different transaction channels such as close proximity (e.g. contactless) transactions, transactions within mobile applications stored on a mobile device, and the like.

The tokens generated by the tokenization module 240 and the mapping between the tokens and the corresponding account identifier (e.g. PAN) may be stored at the token vault 280. The tokenization module 240, in conjunction with the data processor 222, may access the token vault 280 to store the generated tokens and the mapping between the tokens and the corresponding account identifier.

The transaction message processing module 250, in conjunction with the network interface 224, may receive an authorization request message from a resource provider (e.g. a merchant) for example through an intermediary server (e.g. an access device). The transaction message processing module 250 may identify, using the data processor 222, that the authorization request message includes a token. The transaction message processing module 250 may retrieve, using the data processor 222, the token from the authorization request message and provide the token to the token verification module 260.

The token verification module 260 may query, using the data processor 222, the token vault 280 to determine if there is an entry for the token. If an entry is found, the token verification module 260, in conjunction with the data processor 222, may retrieve the account identifier corresponding to the token. In some embodiments, the token verification module 260, in conjunction with the data processor 222, may query databases and/or lists to determine whether the token or the account identifier has been associated with fraudulent activities. For example, the token verification module 260, in conjunction with the data processor 222, may determine whether the token or the account identifier has been blacklisted or has been reported as stolen or otherwise compromised. The token verification module 260, in conjunction with the data processor 222, may further determine whether the token has expired. The token verification module 260, in conjunction with the data processor 222, may transmit the account identifier to the transaction processing module 270. If the token verification module 260 obtained any information about the token and/or the account identifier (e.g. the token being expired, stolen or compromised), the token verification module may pass that information to the transaction processing module 270 along with the account identifier.

The transaction processing module 270 may process, using the data processor 222, the transaction using the account identifier provided by the token verification module. The transaction processing module 270 may also receive the transaction details from the transaction message processing module 250 or the tokenization module 260. In some embodiments, the transaction processing module 270, in conjunction with the data processor 222, may generate a modified authorization request message including the account identifier instead of the token. The transaction processing module 270, in conjunction with the data processor 222, may determine an issuer of the account and send the modified authorization request message to the issuer. In some embodiments, the transaction processing module 270, in conjunction with the data processor 222, may determine the issuer based on information received from the account holder information database 290. In other embodiments, the transaction processing module 270, in conjunction with the data processor 222, may determine the issuer based on a format of the account identifier.

The issuer may process the transaction request and send an authorization response message to the processing network 210. The transaction message processing module 250 may receive, via the network interface 224, the authorization response message from the issuer and transmit the authorization response message to the intended party (e.g. the resource provider). After receiving the authorization response message, the transaction message processing module 250 may determine, with the data processor 222, whether the authorization response message includes the account identifier. If the message includes the account identifier, the transaction message processing module 250, in conjunction with the data processor 222 may retrieve from the token vault 280 the token associated with the account identifier. In some embodiments, the transaction message processing module 250, in conjunction with the data processor 222, may request the tokenization module 240 to replace the account identifier with the token in the authorization response message. This may prevent other entities that process the authorization response message from obtaining confidential account information.

In some embodiments, the token verification module 260 may determine, using the data processor 222, that the token provided in the authorization request message is stolen, compromised or expired. The token verification module 260, in conjunction with the data processor 222 may request the tokenization module 240 to generate a new token to replace the expired, stolen or compromised token.

In some embodiments, the token verification module 260, in conjunction with the data processor 222 may determine that permission from an authorization computer is required for replacing the expired, stolen or compromised token with a new token. The account can be a financial account (e.g. a bank account) and the authorization computer can be a bank or an issuer; the account can be a data access account (e.g. an email account or an account at a website) and the authorization computer can be a web server; or the account can be a physical location access account (e.g. an employee card to gain access to a building) and the authorization computer can be the administrator for the building. Thus, the token verification module 260, in conjunction with the network interface 224, may request permission from the authorization computer. The authorization computer may initiate a form of identification and verification process or a step-up authentication process (e.g. one time pass code, call center call, requesting a PIN from the account holder, etc.) with the account holder before authorizing the generation of a replacement token.

The tokenization module 240, in conjunction with the data processor 222, may generate the replacement token, update the token vault 280 to store the new replacement token in connection with the account identifier, and update the mapping between the account identifier and corresponding tokens. The token verification module 260, in conjunction with the data processor 222, may return the replacement token to the transaction message processing module 250.

The transaction message processing module 250 may send, via the network interface 224, a message (e.g. the authorization response message) to the terminal including the new (e.g. replacement) token. The new token may be transferred to the transaction card 100 via a contact or contactless interaction between the terminal and the transaction card 100. As discussed below in greater detail, the replacement token may replace the token that was digitally displayed on the transaction card 100. In some embodiments, the replacement token may replace a token that was previously stored at a contact/contactless/dual-interface chip of the transaction card 100.

In some embodiments, the processing network 210, in conjunction with the data processor 222, may inform the authorization computer that a token associated with an account has been compromised and a new replacement token has been issued to replace the compromised token. This process does not impact the account identifier as the account identifier has not been compromised. Thus, it is not necessary for the authorization computer to replace the account identifier (e.g. PAN) or to generate a replacement transaction card 100 with the new account information.

In some embodiments, the authorization computer may send a message to the account holder requesting the account holder to update the information on the transaction card 100 via an electronic device. For example, the authorization computer may send a message including the new (e.g. replacement) token to a mobile device of the account holder. The account holder may place the transaction card 100 in proximity of the mobile device (or insert the transaction card 100 in a card reader coupled to the mobile device) to transmit the replacement token from the mobile device to the transaction card 100. In other exemplary embodiments, the account holder may be asked to bring the transaction card 100 to an electronic device associated with the authorization computer (e.g. a banking location, an automated teller machine (ATM), or the like). The account holder may place the transaction card 100 in proximity of the electronic device (or insert the transaction card 100 in a card reader coupled to the electronic device) to transmit the replacement token from the electronic device to the transaction card 100.

Figure 3:
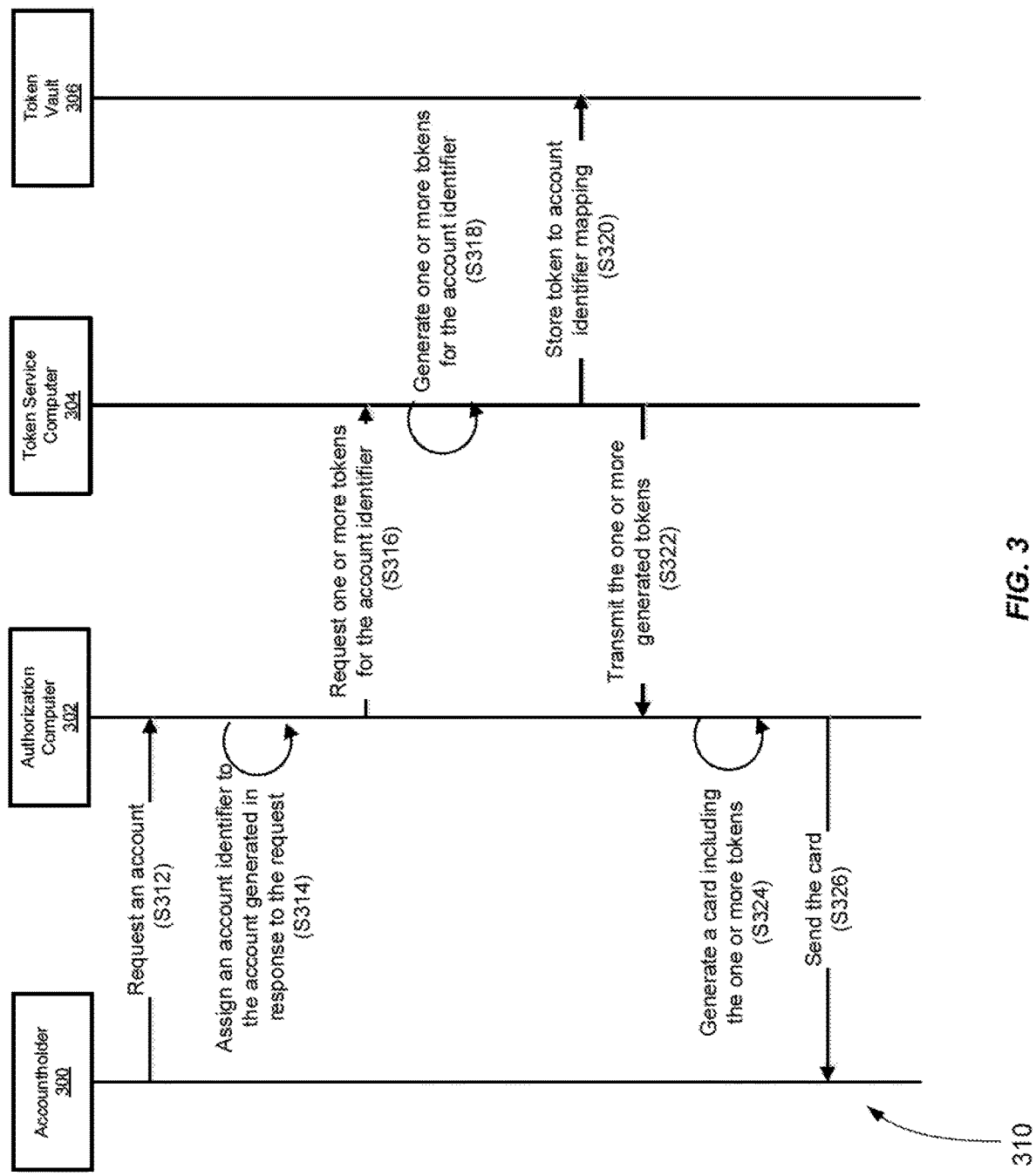
FIG. 3 shows a swim-lane diagram of a tokenized transaction card generation according to an embodiment of the invention.

FIG. 3 illustrates an exemplary flowchart 310 for generating a transaction card with multiple tokens. At S312, the account holder 300 requests opening an account with an authorization computer 302. The account can be a financial account (e.g. a bank account) and the authorization computer can be a bank or an issuer; the account can be a data access account (e.g. an email account or an account at a website) and the authorization computer can be a web server; or the account can be a physical location access account (e.g. an employee card to gain access to a building) and the authorization computer can be the administrator for the building.

At S314, the authorization computer 302 may create the account for the account holder 300 in response to the request and assign an account identifier to the account. The account identifier may include an account number (e.g. PAN) that is used to identify the account.

At S316, the authorization computer 302 may request one or more tokens from the token service computer 304 to represent the account identifier. According to various embodiments, each token may serve as a proxy for the account identifier (e.g. the tokens may be used in lieu of the account identifier). For example the authorization computer 302 may transmit a tokenization request message to the token service provider computer 304 and the tokenization request message may include the account identifier representing the account.

At S318, the token service computer 304 may generate one or more tokens for the account identifier in response to the request from the authorization computer 302. At S320, the token service computer 304 may store the generated tokens, as well as a mapping between the tokens and the account identifier at a storage (e.g. token vault 306). At S322, the token service computer 304 may transmit the one or more generated tokens to the authorization computer 302. According to various embodiments, the token service computer 304 may be a part of or managed by the transaction processing network. In some embodiments, the token service computer 304 may be a third party entity server.

Upon receiving the generated tokens from the token service computer 304, the authorization computer 302 may generate (or interact with a card producing entity to generate) the transaction card including the one or more tokens at S324. The tokens may be provisioned on the transaction card. According to various embodiments, each provisioned token may be associated with a different communication channel between the transaction card and a token recipient device. The account identifier associated with the generated transaction card may not be visible on the transaction card. In some embodiments, the account identifier may not be stored on the transaction card such that only tokens are stored or otherwise provisioned on the transaction card. In yet other embodiments, the account identifier may be stored on a contact and/or contactless element of the transaction card such that the account identifier is not visible on the transaction card. The authorization computer 302 may then send (e.g. provide) the transaction card to the account holder at S326.

Figure 4:
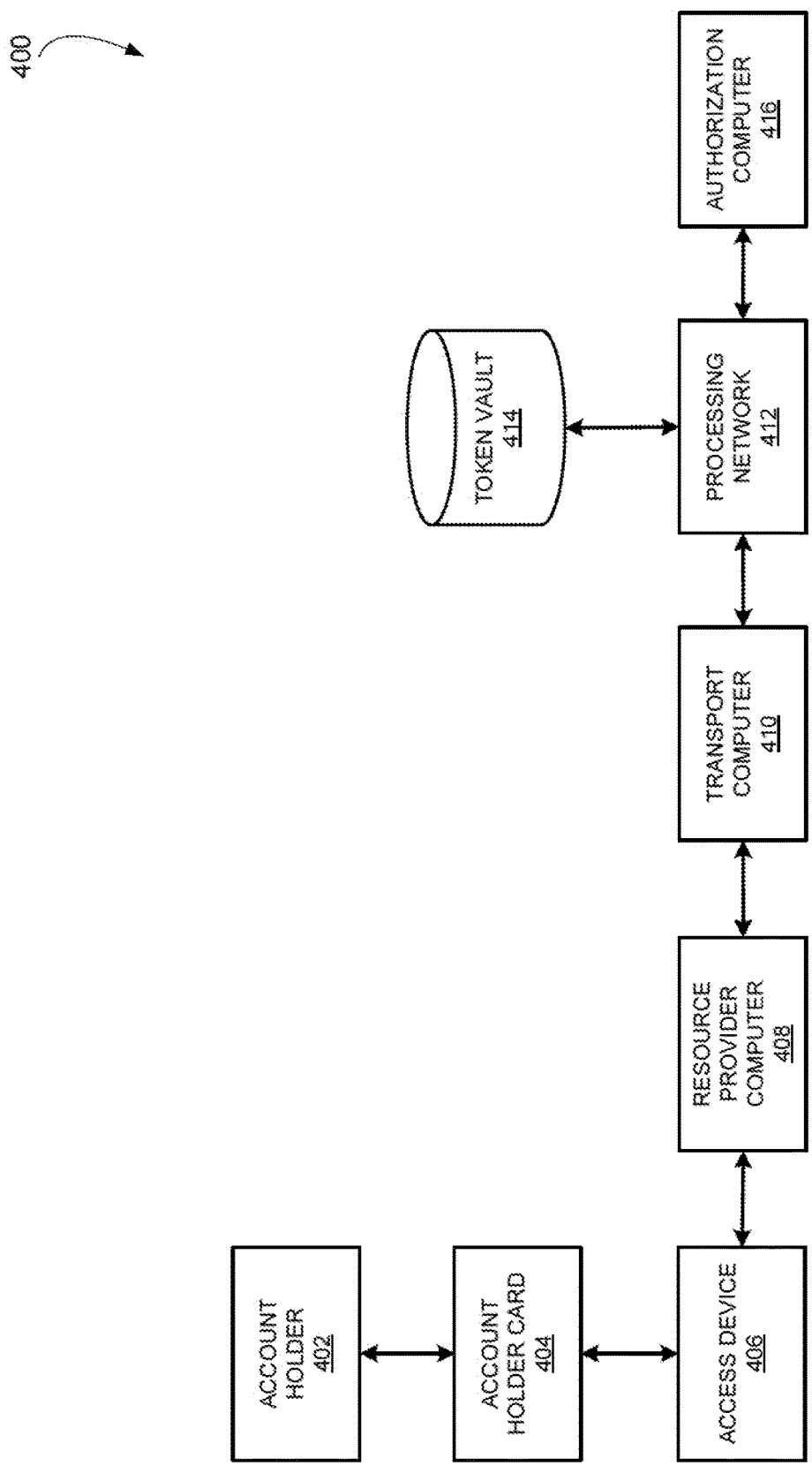
FIG. 4 shows a block diagram of a system for processing a transaction according to an embodiment of the invention.

FIG. 4 illustrates an exemplary block diagram of a system 400 for processing a transaction. An account holder 402 may present their transaction card (e.g. the account holder card 404) to an access device 406 for interacting with the access device 406. The access device 406 may transmit and receive data to and from the account holder card 404 using any number of communication methods supported by the access device 406 and the account holder card 404 such as near-field communications, magnetic-stripe, electrical contact, internet protocol, etc.

The access device 406 may be a device that is coupled to the resource provider computer 408 in this example. In other examples, the access device 406 may be a resource provider computer, or the access device 406 in combination with the resource provider computer 408 may constitute a "resource provider computer." The resource provider computer 408 may be configured to generate, send, and receive authorization messages based on interactions with the account holder 402. The system 400 may further comprise a transport computer 410 configured to receive and forward authorization messages, a transaction processing network 412 configured to process transaction data, and an authorization computer 416 configured to determine authorization decisions or authorization results.

During a transaction, the account holder 402 may present the account holder card 404 to a resource provider. The transaction may be a purchase of goods or services, a request to access a building, an inquiry for sensitive information, etc. In order to conduct the transaction, the resource provider may ask the account holder 402 to transmit his or her stored credentials (e.g. a token) to the access device 406. For example, the resource provider may be a merchant that asks the account holder 402 to insert his or her payment card into a smart card reader of the access device 406. The credentials of the account holder 402 (e.g. the token) may be stored on the account holder card 404 (e.g. the transaction card) in the form of an account identifier or a token that identifies an account of the user.

According to embodiments of the invention, the account holder card 404 may transmit credentials instantly to the access device 406 after a connection has been established or after confirmation of authenticating data such as a PIN, password, biometric, etc. The access device 406 may receive the credentials from the account holder card 404 and may transmit the credentials to the resource provider computer 408. The resource provider may use the received credentials to generate a message requesting information relating to the account holder 402.

In one embodiment, the resource provider computer 408 may use the received credentials to generate an authorization request message. For example, the authorization request message may comprise the token associated with the account of the account holder 402. The resource provider computer 408 may send the authorization request message to the transport computer 410. The transport computer 410 may be any computer for receiving and forwarding authorization messages according to embodiments of the invention. In one embodiment, transport computer 410 may be a computer of an acquiring entity that enables a resource provider to conduct specific types of transactions.

The transport computer 410 may receive the authorization request message from the resource provider computer 408 and may forward the message to the transaction processing network 412. The transaction processing network 412 may be any computer or server computer for processing transactions according to embodiments of the invention. For example, the transaction processing network 412 may be a computer of a payment processing network, such as VisaNet, and may be configured to receive, read, analyze, store, and retrieve transaction data as well as determine appropriate actions based on predetermined logic. The transaction processing network 412 may analyze the authorization request message to determine whether the message includes a token. If the transaction processing network 412 determines that the authorization request message includes a token, the transaction processing network 412 provides the token to the token vault 414 and retrieves the account identifier (e.g. PAN) corresponding to (e.g. represented by) the token. The transaction processing network 412 may then replace the token with the account identifier in the authorization request message.

According to embodiments of the invention, the transaction processing network 412 may determine, based on the data in the authorization request message, an authorizing entity computer or authorization computer 416. For example, the transaction processing network 412 may analyze the account identifier and may determine that the first six digits of the account identifier comprises an issuer identification number (IIN) specifying an authorizing system associated with the account represented by the account identifier. In one embodiment, the authorization computer 416 may be a computer of an issuing entity that issues credentials and/or the account holder card 404 to the account holder 402 such as a bank, government agency, security network, etc. Upon determination of the authorizing entity computer, the transaction processing network 412 may determine an address of the authorization computer 416, so that the authorization request message can be routed to the authorization computer 416 for authorization of the transaction.

The transaction processing network 412 may send the authorization request message to the authorization computer 416, and the authorization computer 416 may receive the authorization request message to determine an authorization result based on the data contained therein. For example, the data may comprise an account identifier or PAN that is associated with an availability of funds or credit that may be compared to a transaction amount. The authorization computer 416 may evaluate the received data and determine an authorization result of "approve" or "decline." The authorization result may be used to generate an authorization response message that may be sent back to the transaction processing network 412. The transaction processing network 412 may receive the authorization response message and may send the message to the transport computer 410. The transport computer 410 may then forward the authorization response message to the resource provider computer 408 so that the resource provider may determine an action based on the authorization result contained therein.

Some of the steps discussed in connection with FIG. 4 may be used to update a token that is expired, stolen or compromised.

Figure 5:
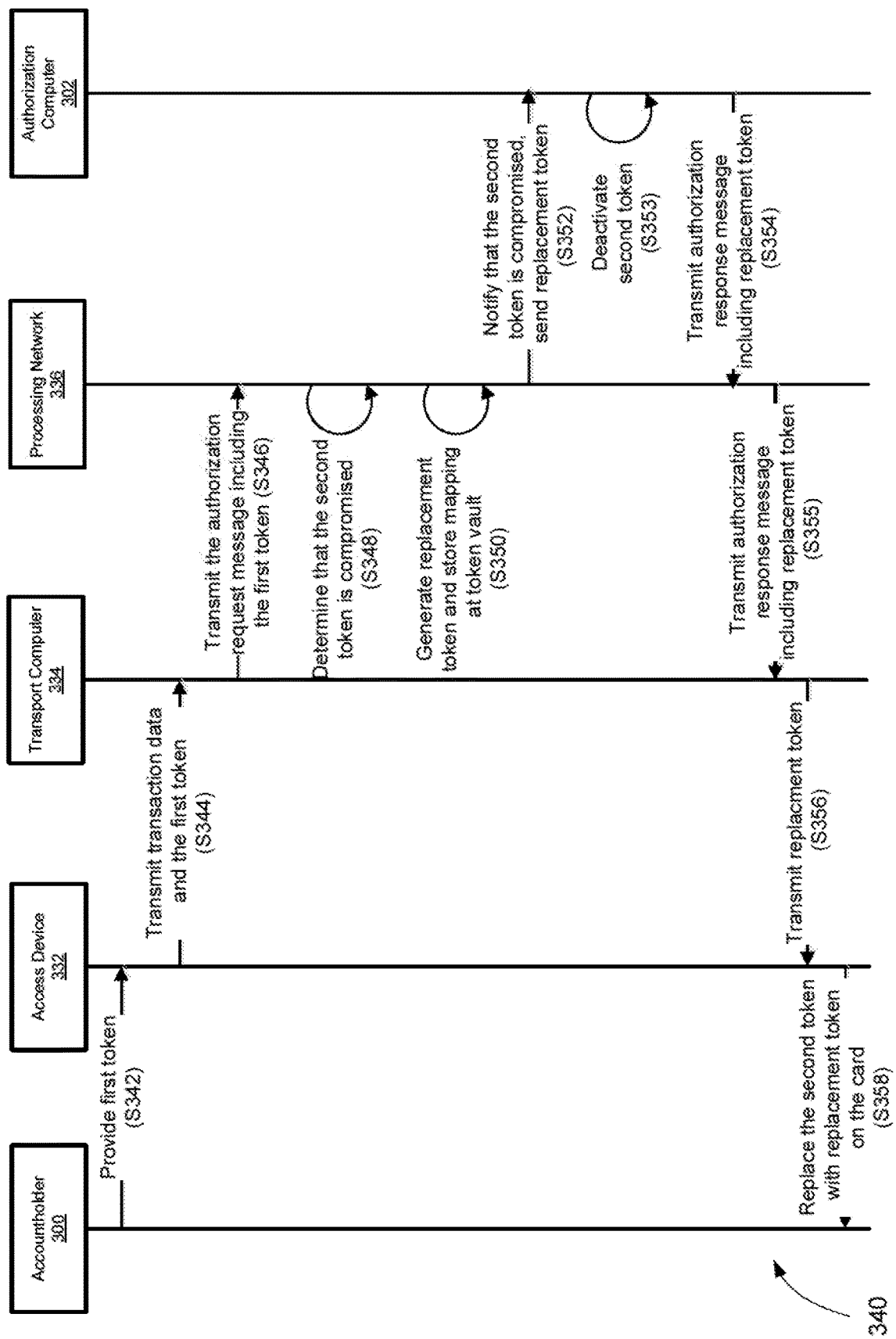
FIG. 5 shows a swim-lane diagram of updating a token on a tokenized transaction card at an access device according to an embodiment of the invention.

FIG. 5 shows a swim-lane diagram 340 of updating a token on a tokenized transaction card at an access device according to an embodiment of the invention. As discussed in connection with FIG. 4, the account holder may use the transaction card to conduct a transaction with a resource provider. During the transaction, at S342 the account holder 300 may present a first token (e.g. the token that is stored on a contact/contactless or dual interface of the transaction card) to an access device 332 of the resource provider. For example, when the account holder 300 brings the transaction card in contact with or in close proximity of the access device 332, the access device 332 may read or otherwise retrieve the first token from the contact/contactless or dual interface of the transaction card. At S344, the access device 332 may transmit the first token along with additional transaction data (e.g. a transaction amount, transaction date, an identifier for the access device, among other data) to a transport computer 334.

The transport computer 334 or, in some embodiments, the access device, may generate an authorization request message including the first token and the additional transaction data. At S346, the transport computer 334 may transmit the authorization request message to the processing network 336.

Upon receiving the authorization request message including the first token, the processing network 336 may process the authorization request message to detokenize the first token. That is, the processing network 336 may query the token vault to identify the account identifier corresponding to the first token. At S348, the processing network 336, while processing the authorization request message using the first token, may determine that another token associated with the transaction card (e.g. the second token that is digitally displayed on the transaction card) is expired, stolen or compromised. For example, the processing network 336 may query a database for blacklisted tokens. In some embodiments, the processing network 336 may have been previously notified (e.g. by a resource provider) that the second token is among tokens that have been used in fraudulent transactions or compromised during a data breach. Upon determining that the second token is expired, stolen or compromised, the processing network 336 may generate a replacement token. The processing network 336 may store the replacement token along with a mapping between the replacement token and the corresponding account identifier at a token vault (S350).

At S352, the processing network 336 may notify the authorization computer 302 that the second token was compromised and that a replacement token was generated to replace the compromised second token. The processing network 336 may send the replacement token to the authorization computer 302. The processing network 336 may also send the authorization request message along with the account identifier (retrieved from the token vault) corresponding to the first token to the authorization computer 332.

Upon being notified that the second token was compromised, the authorization computer 302 may deactivate the second token (S353). According to various embodiments, when one of the tokens (e.g. second token) provisioned on the payment card is deactivated, the transaction card includes at least one active token that can be used to conduct transactions.

In some embodiments, the authorization computer 302 may deactivate all tokens associated with account identifier if one of the tokens have been compromised. The processing network 336 may also have been previously instructed by the authorization computer 302 to replace all tokens associated with an account identifier in the event that one of the tokens associated with that account identifier has been compromised. In yet other embodiments, the authorization computer 302 may request the processing network 336 to update the tokens on a transaction card periodically. As discussed herein, the tokens on the transaction card may be replaced without replacing the transaction card, and with little or no burden to the card holder.

In some embodiments, when the authorization computer 302 deactivates one or more tokens, the authorization computer 302 may notify the account holder (e.g. via e-mail, text message, mail or telephone call) that the information on the transaction card (e.g. one or more tokens provisioned on the transaction card) need to be updated using an electronic device, such as an ATM or terminal at a physical location of the authorization computer 302. According to some embodiments, the authorization computer 302 may send the replacement token to a communication device (e.g. mobile phone) of the account holder 300. The information on the transaction card may be updated by the communication device via short range communication or through a card reader coupled to the communication device. The token update process on the transaction card is discussed below in connection with FIG. 6.

In some embodiments, the information on the transaction card may be updated using the access device (e.g. a terminal) associated with the resource provider. In such embodiments, the authorization computer 302 may generate an authorization response message that includes a determination of the authorization request (e.g. approve or decline authorization for the transaction initiated using the first token) along with the replacement token(s) for the compromised token(s) (e.g. the replacement token for the second token). At S354, the authorization computer 302 may transmit the authorization response message to the processing network 336. The authorization response message is associated with the transaction initiated using the first token at S342. However, the authorization request message may also include the replacement second token. At S355, the processing network 336 may transmit the authorization response message (along with the replacement token) to the transport computer 334.

After receiving the authorization response message approving or declining authorization for the transaction, the transport computer 334 may process the transaction (either proceeds with the transaction or cancels the transaction depending on the authorization computer's reply). At S356, the transport computer 334 may transmit the replacement token(s) in the authorization response message to the access device 332. When the account holder 300 brings the transaction card in contact with or in close proximity to the access device 332, the access device replaces the compromised token (e.g. the second token) with the replacement token on the transaction card (S358). If the authorization response message includes multiple tokens, all corresponding tokens are replaced with the new replacement tokens on the transaction card. In the case of multi-token replacement, each replacement token may be paired with the old token or an indicator of which token is to be replaced.

In some embodiments, the authorization response message transmitted to the access device 332 from the authorization computer 302 may include a script with the replacement token. The script, when executed by the access device 332, may replace the second token with the replacement token on the transaction card when the access device 332 is in communication with the transaction card.

Figure 6:
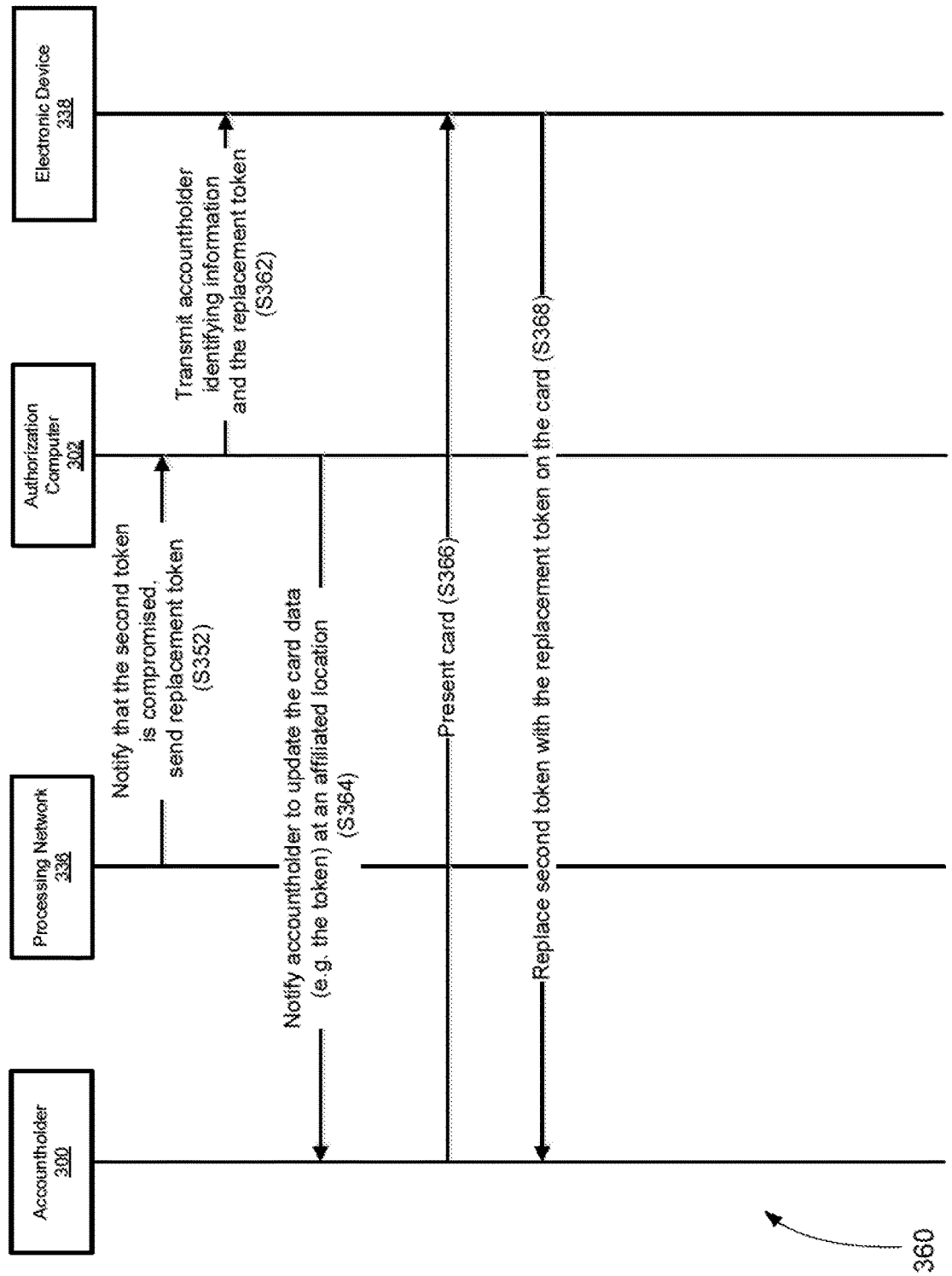
FIG. 6 shows a swim-lane diagram of updating a token on a tokenized transaction card using an electronic device according to an embodiment of the invention.

FIG. 6 shows a swim-lane diagram 360 of updating a token on a tokenized transaction card using an electronic device according to an embodiment of the invention. As discussed above in connection with FIG. 5, the processing network 336 may notify the authorization computer 302 that the token (e.g. second token) is expired, stolen or compromised. The processing network 336 may also send, to the authorization computer 302, the new replacement token generated to replace the second token (at S352).

At S362, the authorization computer 302 may transmit the replacement token and, if necessary, the account holder identifying information (e.g. account holder name, billing address, a consumer identification number, telephone number, etc.) to an electronic device 338. In some embodiments, the authorization computer 302 may send a script with the replacement token. The script, when executed by the electronic device 338, may replace the second token with the replacement token on the transaction card when the electronic device 338 is in communication with the transaction card. The electronic device 338 may be an access device (e.g. a point of sale terminal), a user device of the account holder (e.g. a mobile phone) or a terminal at a physical location associated with the authorization entity (e.g. an ATM). At S362, the authorization computer 302 may also notify the account holder 300 to update the account information stored on the transaction card using the electronic device 338.

At S366, the account holder 300 may present the transaction card to the electronic device 338 identified by the authorization computer 302. At S368, the electronic device 338 may update the account information on the transaction card. For example, the electronic device 338 may replace the expired or compromised second token with the new replacement token. If the compromised token is displayed on a digital display coupled to the transaction card, the electronic device 338 may reconfigure the digital display to display the replacement token instead of the compromised token. The compromised token will be erased from the transaction card, and the replacement token will be stored and/or displayed on the transaction card.

If the electronic device 338 is an access device (e.g. a POS terminal), the authorization computer 302 may transmit the replacement token and, if necessary, a script and account holder identifying information to the access device in form of an authorization response message. The account holder may either bring the transaction card in close proximity of the access device (e.g. tap the transaction card to the access device), may insert the transaction card into a card reader, or may slide the transaction card through a card reader coupled to the access device. When the access device identifies that information associated with the transaction card matches the information (e.g. the account holder identifying information) provided by the authorization computer 302, the access device may replace at least one token (e.g. the second token) with the replacement token on the transaction card. For example, the access device may execute the script provided by the authorization computer 302 to perform the replacement of the token with the new token on the transaction card.

If the electronic device 338 is a communication device of the account holder (e.g. a mobile phone), the authorization computer 302 may transmit the replacement token and, if necessary, a script to the communication device. In some embodiments, the authorization computer 302 may send an over-the-air message to the communication device using the cellular communication network to transmit the replacement token and, when applicable, the script. In some embodiments, the authorization computer 302 push the replacement token and, when applicable, the script to the communication device (e.g. via e-mail or as part of an issuer update package). The account holder may either bring the transaction card in close proximity of the communication device (e.g. tap the transaction card to the communication device), may insert the transaction card into a card reader, or may slide the transaction card through a card reader coupled to the communication device. The communication device may replace at least one token (e.g. the second token) with the replacement token on the transaction card. For example, the communication device may execute the script provided by the authorization computer 302 to perform the replacement of the token with the new token on the transaction card.

If the electronic device 338 is a terminal of the authorization entity (e.g. an ATM), the authorization computer 302 may transmit the replacement token and, if necessary, a script and account holder identifying information to terminal. The account holder may either bring the transaction card in close proximity of the terminal (e.g. tap the transaction card to the access device), may insert the transaction card into a card reader, or may slide the transaction card through a card reader coupled to the terminal. When the terminal identifies that information associated with the transaction card matches the information (e.g. the account holder identifying information) provided by the authorization computer 302, the terminal may replace at least one token (e.g. the second token) with the replacement token on the transaction card. For example, the terminal may execute the script provided by the authorization computer 302 to perform the replacement of the token with the new token on the transaction card.

According to various embodiments, the compromised token on the transaction card may be replaced when the transaction card is used for a transaction using the compromised token. For example, the account holder may present the transaction card for a transaction using the compromised token without knowing that the token was compromised. For example, if the transaction is an e-commerce transaction, the account holder 300 may provide the second token to the resource provider using a communication device (e.g. on a website of the resource provider displayed on a computer of the account holder). In some embodiments, the resource provider or the account holder 300 may enter the second token to the access device 332 (e.g. POS) of the resource provider. During the processing of the transaction using the compromised token, the processing network 336 may determine that the token has been identified and/or reported as expired, stolen or compromised. The processing network 336 may generate a replacement token (as discussed above) and provide the replacement token to the authorization computer 302 for provisioning on the transaction card. The processing network 336 may also provide the authorization request message for the transaction initiated using the compromised token to the authorization computer 302. The authorization computer 302 may generate an authorization response message approving or declining the transaction initiated using the compromised token, the authorization computer 302 may include the replacement token in the authorization response message. The expired, stolen or compromised token on the transaction card may be replaced with the replacement token as discussed above. This use case allows the account holder who is still in possession of the transaction card to update the account information (e.g.

tokens) stored or provisioned on the transaction card without having to replace the transaction card.

Embodiments of the invention provide for a number of advantages. Embodiments enable the replacement of tokens on a transaction card without replacing the transaction card. In fact, the transaction card may not have to be replaced unless the card holder loses the transaction card. Embodiments further enable the replacement of tokens on a transaction card using electronic devices such as mobile phones, POS terminals or ATM terminals. Conventional systems are not able to use these terminals for token replacement on a transaction card.

Embodiments further provide a digital display coupled to the transaction card for dynamically displaying a token. This way, the token displayed on the digital display may be replaced with a new token by refreshing the digital display without having to replace the transaction card. Eliminating the generation of a replacement transaction card reduces the financial cost and inefficiencies associated with generating a new transaction card. Eliminating the generation of a replacement transaction card also improves the impact on the environment by reducing the plastic and other harmful materials used during the manufacturing of transaction card elements (e.g. chips).

Embodiments also enable the card holder to continue using the account or the transaction card to conduct new transactions if one token is compromised. The card holder does not have to wait for a replacement card to arrive and be activated. Instead, the card holder may continue conducting transactions using the remaining token(s) on the transaction card. In addition, the replacement token may be provisioned on the transaction card on the same day that a token is identified as expired, stolen or compromised. Accordingly, embodiments provide valuable time savings by providing an efficient way to update data on a transaction card.

Some entities or components described herein may be associated with or operate one or more computer apparatuses to facilitate the functions described herein. Some of the entities or components described herein, including any server or database, may use any suitable number of subsystems to facilitate the functions.

Examples of such subsystems or components can be interconnected via a system bus. Additional subsystems such as a printer, keyboard, fixed disk (or other memory comprising computer readable media), monitor, which is coupled to display adapter, and others are shown. Peripherals and input/output (I/O) devices, which couple to I/O controller (which can be a processor or other suitable controller), can be connected to the computer system by any number of means known in the art, such as serial port. For example, serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium.

Embodiments of the invention are not limited to the above-described embodiments. For example, although separate functional blocks are shown for an issuer, payment processing network, and acquirer, some entities may perform a combination or all of these functions and may be included in some embodiments.

Messages between the computers, networks, and devices described herein may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

It should be understood that the present invention as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method performed by a server computer, the method comprising:
    transmitting a tokenization request message to a token service provider system, the tokenization request message including an account identifier representing an account of a user;
    receiving, from the token service provider system, a plurality of tokens corresponding to the account identifier;
    provisioning the plurality of tokens on a transaction card, wherein each token is associated with a different communication channel between the transaction card and a token recipient device, wherein provisioning includes:
        storing a first token at a first element of the transaction card, and
        storing a second token at a second element of the transaction card, wherein the first element or the second element is one of a contact interface chip, a contactless interface chip, a dual interface chip, a magnetic strip, or a digital display of the transaction card, wherein the first element is different than the second element;

deactivating the first token when the first token is compromised or expired;
receiving, from a transaction terminal of a resource provider, an authorization request message for a transaction initiated using the second token stored on the transaction card;
processing the authorization request message using the second token; and
transmitting, to the transaction terminal of the resource provider, an authorization response message indicating whether the transaction is authorized or declined using the second token, wherein the authorization response message transmitted to the transaction terminal further includes a replacement token to replace the first token on the transaction card without replacing the transaction card by providing the replacement token to the transaction card via the transaction terminal, the providing including:
presenting, by the user, the transaction card to the transaction terminal;
receiving, by the transaction card, the replacement token while the transaction card is in communication with the transaction terminal, wherein the replacement token is stored on the transaction card replacing the first token.

2. The method of claim 1, further comprising:
upon deactivating the first token, notifying an account holder of the account that data associated with the transaction card is to be updated using the transaction terminal.

3. The method of claim 1, wherein the first token is digitally displayed on the transaction card.

4. The method of claim 3, wherein, after the first token is replaced with the replacement token, the replacement token is digitally displayed on the transaction card instead of the first token.

5. The method of claim 1, wherein the first token or the replacement token is visible on an element coupled to the transaction card.

6. The method of claim 1 wherein transmitting the replacement token to the transaction terminal further comprises:
transmitting a script with the replacement token to the transaction terminal, wherein the script, when executed by the transaction terminal, replaces the first token with the replacement token on the transaction card.

7. The method of claim 1, wherein the first token and the replacement token are associated with a same communication channel between the transaction card and the token recipient device.

8. The method of claim 1, wherein the plurality of tokens are provisioned on the transaction card instead of the account identifier.

9. The method of claim 1, wherein the account identifier is invisible on the transaction card.

10. The method of claim 1, wherein when the first token is deactivated, the transaction card includes at least one active token.

11. A server computer comprising:
a processor; and
a computer readable medium coupled to the processor, the computer readable medium comprising code, executable by the processor, to implement a method comprising:
transmitting a tokenization request message to a token service provider system, the tokenization request message including an account identifier representing an account of a user;
receiving, from the token service provider system, a plurality of tokens corresponding to the account identifier;
provisioning the plurality of tokens on a transaction card, wherein each token is associated with a different communication channel between the transaction card and a token recipient device, wherein provisioning includes:
storing a first token at a first element of the transaction card, and
storing a second token at a second element of the transaction card, wherein the first element or the second element is one of a contact interface chip, a contactless interface chip, a dual interface chip, a magnetic strip, or a digital display of the transaction card, wherein the first element is different than the second element;
deactivating the first token when the first token is compromised or expired;
receiving, from a transaction terminal of a resource provider, an authorization request message for a transaction initiated using the second token stored on the transaction card;
processing the authorization request message using the second token; and
transmitting, to the transaction terminal of the resource provider, an authorization response message indicating whether the transaction is authorized or declined using the second token, wherein the authorization response message transmitted to the transaction terminal further includes a replacement token to replace the first token on the transaction card without replacing the transaction card by providing the replacement token to the transaction card via the transaction terminal, the providing including:
presenting, by the user, the transaction card to the transaction terminal;
receiving, by the transaction card, the replacement token while the transaction card is in communication with the transaction terminal, wherein the replacement token is stored on the transaction card replacing the first token.

12. The server computer of claim 11, wherein the method implemented by the code further comprises upon deactivating the first token, notifying an account holder of the account that data associated with the transaction card is to be updated using the transaction terminal.

13. The server computer of claim 11, wherein the first token is digitally displayed on the transaction card; and wherein, after the first token is replaced with the replacement token, the replacement token is digitally displayed on the transaction card instead of the first token.

14. The server computer of claim 11, wherein transmitting the replacement token to the transaction terminal further comprises:
transmitting a script with the replacement token to the transaction terminal, wherein the script, when executed by the transaction terminal, replaces the first token with the replacement token on the transaction card.

15. The server computer of claim 11, wherein the first token and the replacement token are associated with a same communication channel between the transaction card and the token recipient device.

16. The server computer of claim 11, wherein the plurality of tokens are provisioned on the transaction card instead of the account identifier, and wherein the account identifier is invisible on the transaction card.

17. The server computer of claim 11, wherein when the first token is deactivated, the transaction card includes at least one active token.

\* \* \* \* \*